United States Patent [19]

Euverard

[11] Patent Number: 4,776,099

[45] Date of Patent: Oct. 11, 1988

[54] WET FILM THICKNESS GAUGE

[75] Inventor: Maynard R. Euverard, Williamsburg, Va.

[73] Assignee: Paul N. Gardner Company, Inc., Pompano Beach, Fla.

[21] Appl. No.: 78,807

[22] Filed: Jul. 28, 1987

[51] Int. Cl.$^4$ .............................................. G01B 5/18
[52] U.S. Cl. .................................................. 33/169 F
[58] Field of Search ............. 33/169 R, 169 B, 169 F, 33/168; 73/150 R

[56]  References Cited

U.S. PATENT DOCUMENTS

| | | | |
|---|---|---|---|
| 2,167,652 | 8/1939 | Hoch | 33/169 F |
| 2,507,592 | 5/1950 | Euverard | 33/169 F |
| 2,675,623 | 4/1954 | Lewis et al. | 33/169 F |
| 3,128,558 | 4/1964 | Euverard | 33/169 F |
| 3,423,837 | 1/1969 | Euverard | 33/169 F |
| 4,169,319 | 10/1979 | Gardner | 33/169 F |
| 4,377,037 | 3/1983 | Taylor | 33/169 F |

FOREIGN PATENT DOCUMENTS 685238  12/1952  United Kingdom .............. 33/169 F

OTHER PUBLICATIONS

Maynard R. Euverard, *Thickness Measurement*.

*Primary Examiner*—William A. Cuchlinski, Jr.
*Assistant Examiner*—Patrick R. Scanlon
*Attorney, Agent, or Firm*—Burns, Doane, Swecker & Mathis

[57] ABSTRACT

An apparatus for use in the measurement of the thickness of a wet coating applied to a supporting surface includes a measuring disk having a support axis, a circumferential edge, the radial distance between the support axis and the circumferential edge varying at points along at least a portion of the edge, and indicia indicative of a coating thickness around that portion of the circumference. A disk support member supports the disk in a plane which is substantially perpendicular to the surface of the coating and permits rotation of the disk about the support axis within the plane so as to permit a measurement of the thickness of the coating to be made. The disk support member includes at least one support leg adapted to penetrate the coating and rest on the supporting surface to position the disk in the substantially perpendicular orientation with respect to the coating surface and to maintain the disk in the orientation while a measurement is made. A grip is provided for permitting gripping of the apparatus while a measurement is being made. A method of measuring the thickness of a wet coating applied to a supporting surface is also disclosed.

11 Claims, 2 Drawing Sheets

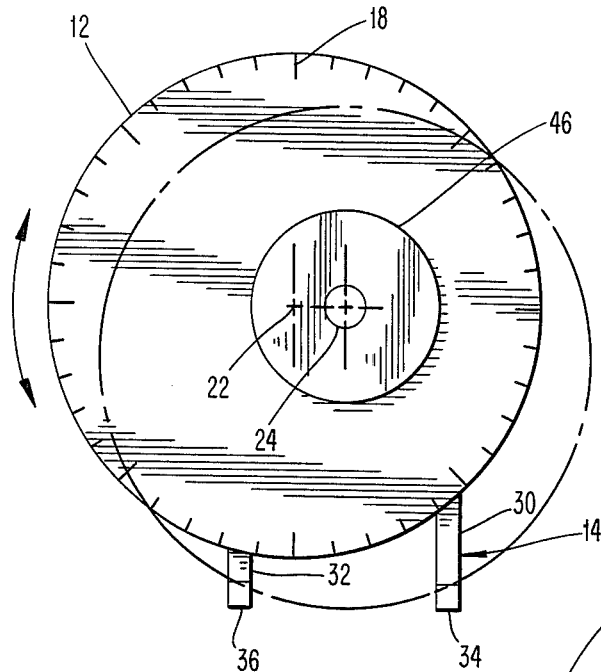
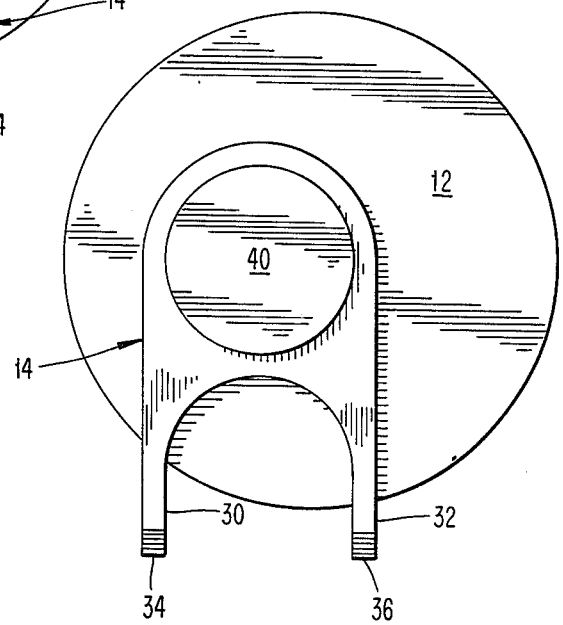
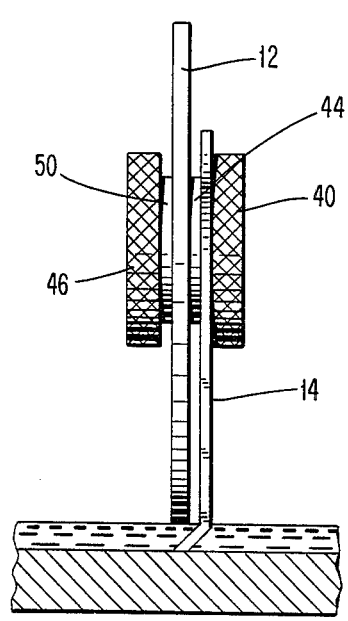
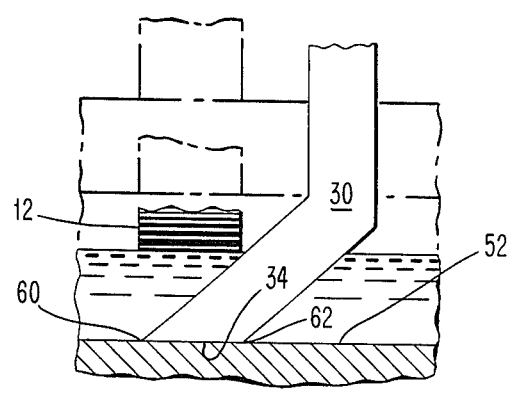

WET FILM THICKNESS GAUGE

BACKGROUND OF THE INVENTION

1. Field of the Invention

The present invention relates generally to measuring instruments and, more particularly, to a method and apparatus for measuring the thickness of wet coatings or films.

2. Description of the Prior Art

It is often desired to determine the thickness of a wet film applied to a surface in order to check the accuracy of a coating operation being employed to apply the coating. Examples of devices used to make such measurements can be found in U.S. Pat. No. 2,507,592 and U.S. Pat. No. 3,128,558, both issued to Maynard R. Euverard.

Such gauges are designed to roll along a film-covered surface in order to measure the thickness of the film. The structure employed in the known devices to carry out the measurement includes a pair of surface-contacting support disks which are mounted on a rotary axle. Between the support disks, or positioned to the outside of one of them, is a thickness measuring structure which can be in the form of an eccentrically mounted disk. The measuring disk presents a continuous surface located at different distances from the outer diameter of the support disks. By rolling the gauge across the film covered surface, a portion of the surface of the measuring disk, situated above the level of the film, will not be wetted, while those surfaces at or below such level will be wetted. The operator need only thereafter inspect the gauge and take the reading of that wetted surface located the greatest distance from the plane of the periphery of the support disks.

Although this known type of measuring gauge permits very accurate measurements to be made within the range of the gauge, as the gauge is usually produced from a single solid block of metal, the range itself is typically very limited to enhance the gauge accuracy and may be limited so as to cover as small a range as 0 to 2 mils (0.000 to 0.002 inches).

Another incidental effect of using the known gauges is that a mar is usually left in most types of films by the rolling edges of the support disks which contact the film during the entire rolling measurement operation.

It is desired to provide a gauge which permits accurate measurements to be made of wet coatings and films having an increased range of thicknesses, e.g. up to 200 mils and even greater, with the same relative accuracy as the known devices. It is further desired to provide a gauge which can be used with less risk of substantially interfering with the coating during the measuring operation.

OBJECTS AND SUMMARY OF THE INVENTION

An object of the present invention is to provide a method and apparatus for measuring the thickness of wet coatings or films over an increased range of depths than previously known methods and devices.

It is a further object of the invention to provide a method and apparatus for accurately measuring coating and film thicknesses without the need for special skills to use and read the measuring gauge employed.

Another object of the invention is to permit such accurate measurements to be made without a significant mar being left behind by rollers which must roll across the coating or film during the measurement operation.

These and other objects are achieved by the present invention which relates to a method and apparatus for measuring wet coatings and films.

The apparatus of the invention includes a measuring disk having a support axis, a circumferential edge, the radial distance between the support axis and the edge varying at points along at least a portion of the edge, and indicia indicative of a coating thickness around at least that portion of the circumference. Disk support means support the disk in a plane which is substantially perpendicular to the surface of the coating and permit rotation of the disk in the plane about the support axis so as to permit a measurement of the thickness of the coating to be made. The disk support means includes at least one support leg adapted to penetrate the coating and rest on the supporting surface to position the disk in the substantially perpendicular orientation with respect to the coating surface and to maintain the disk in that orientation while a measurement is made. Means for gripping the apparatus while a measurement is made are also provided.

The measuring disk is preferably supported about a support axis which is offset from the central axis of the disk to enable eccentric rotation of the disk with respect to the central axis. This can be achieved by providing a hole in the disk along the support axis through which a central shaft of the gripping means passes, the central shaft providing the support to the disk. The support means may also be provided with a hole therethrough such that the central shaft of the gripping means can pass through both the disk and the support means and grips at either end of the central shaft can hold the apparatus together while permitting rotation of the disk about the support axis.

The method of the invention includes the step of positioning a circular measurement disk adjacent to and out of contact with a coating to be measured so that the disk is located in a plane which is substantially perpendicular to the coating. The disk is then rotated within the plane about the support axis so that the disk rotates eccentrically with respect to the central axis. This rotation is continued until the circumference of the disk has come into contact with the surface of the coating, at which point the disk is removed from the vicinity of the coating and the position along the circumference of the disk at which the coating contacts the disk is noted. This position is indicative of the thickness of the coating at the point of measurement and can be indicated by marks placed on the circumference of the disk prior to the measurement operation.

By employing the apparatus of the invention, several advantages can be achieved. For example, an increased range of coating thicknesses can be measured by the apparatus as compared with known rolling devices which can typically measure within only very limited ranges of less than 1/16 inches. The inventive apparatus can be used in measurements of coating thicknesses of up to ½ inches and beyond.

Further, thicknesses in the increased range can be measured by the inventive apparatus with reliable retention of the accuracy and amplification of scale common in known rolling type thickness gauges. The construction of the apparatus ensures the repeatability of accurate measurements and is a light weight structure for ease of use. In addition, use of the apparatus produces only a minimal mar on the measured surface as compared with known rolling contact type gauges.

BRIEF DESCRIPTION OF THE DRAWING

The preferred embodiment of the invention is discussed in the following detailed description which should be considered in connection with the figures in the accompanying drawing, in which:

FIG. 3 is a front view of the measurement apparatus of FIG. 1;

FIG. 4 is a rear view of the measurement apparatus of FIG. 1;

FIG. 5 is a side view of the measurement apparatus of FIG. 1; and

FIG. 6 is a magnified view of the lower end of the support bipod structure of the measurement apparatus of FIG. 5 showing a measurement disk in contact with a coating surface.

DETAILED DESCRIPTION OF A PREFERRED EMBODIMENT

Figure 1:
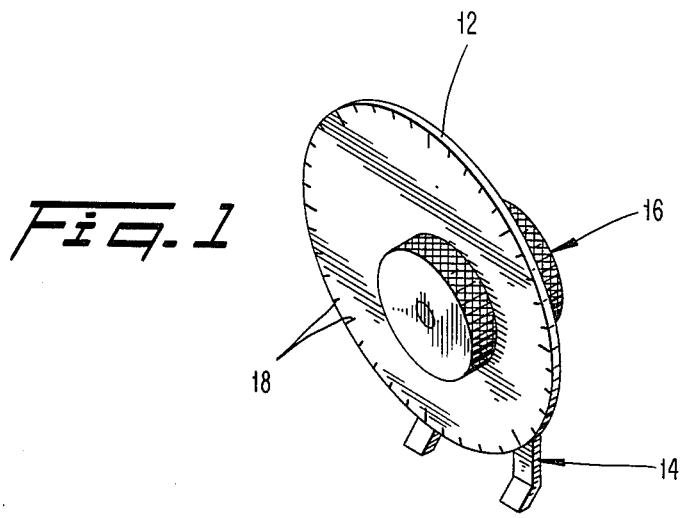
FIG. 1 is a perspective view of a wet coating thickness measurement apparatus according to a preferred embodiment of the invention.

A preferred embodiment of the present invention is shown perspectively in FIG. 1. In that figure the apparatus can be seen to include three basic parts: a measurement disk 12, a support bipod 14, and a finger grip assembly 16. These basic parts are assembled in a manner as shown in the figure and described below, and make up a lightweight, easily usable and inexpensive apparatus which may be used to measure wet coating or film thicknesses within a broad range of thicknesses.

Figure 2:
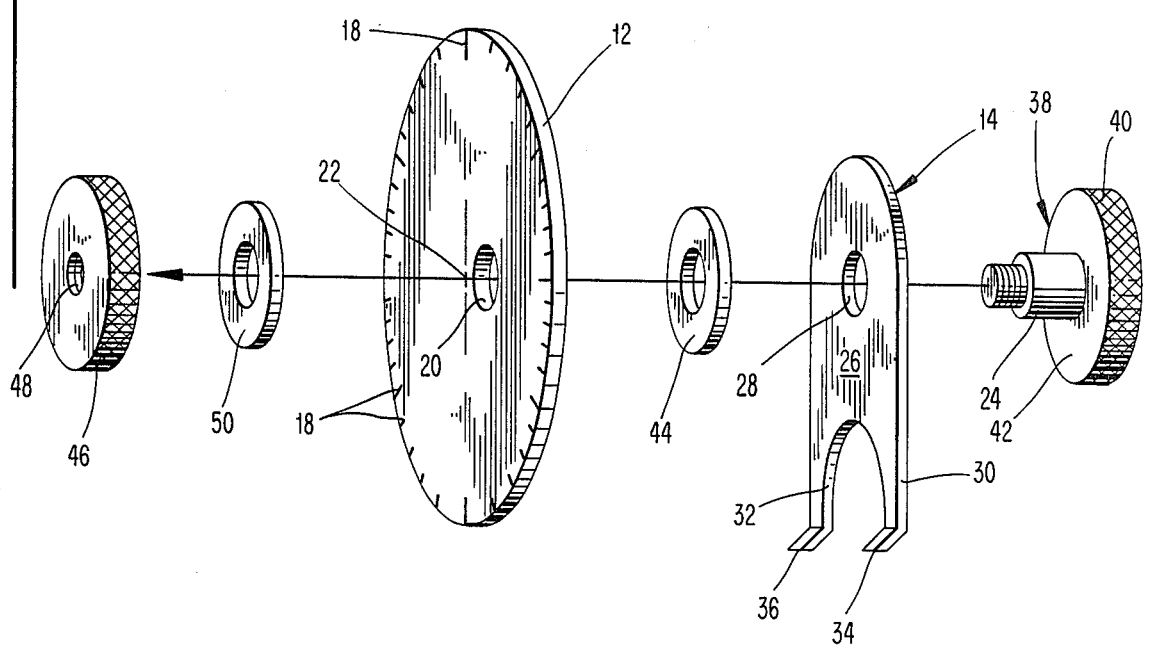
FIG. 2 is an exploded perspective view of the apparatus shown in FIG. 1.

As shown in FIG. 2, the measurement disk 12 is preferably circular and is provided about at least a portion of its circumference with a plurality of marks 18 indicative of thicknesses to be measured by the apparatus. It should be noted, of course, that the disk need not be circular but may instead be shaped, e.g. in a segment of a spiral, in which case the center of rotation of the disk would be the center of the spiral and the minimum thickness marking would be located 360° away from the maximum thickness marking. In addition, the markings on the disk, which are similar to the markings used in the above-mentioned prior art devices, preferably are representative of a trigonometric SINE function which provides a sufficiently accurate scale by which the thickness can be measured. It is preferred that each half of the circumference of the disk 12 be provided with a separate set of markings 18 so as to enable two measurements to be made in any single measurement operation. This permits a coating thickness to be measured twice in a single operation and enables the two measured values to be averaged so that a more accurate measurement value can be determined.

A hole 20 which defines a support axis of the disk 12, is provided in the measurement disk 12 at a point offset from a central axis 22 of the disk. This hole 20 receives a support shaft 24 on which the disk 12 is rotatably mounted so as to permit eccentric rotation of the disk 12 with respect to the central axis 22 of the disk 12. The function of the eccentric mount will be discussed more fully below with respect to the method of using the apparatus.

The support bipod 14 is also illustrated in FIG. 2 and includes a main body portion 26 with a centrally located hole 28 therein and two support legs 30 and 32 extending from the lower end of the body portion 26 in a direction generally perpendicular to the direction of the axis of the hole 28. The legs 30 and 32 are spaced at equal distances to either side of the axis of the hole 28. The lower ends of the legs 30 and 32 are canted at an angle sufficient to position the bottom contact surfaces 34 and 36 of the legs 30 and 32 beneath the disk 12 when the apparatus is assembled. The contact surfaces 34 and 36 at the lower ends of the legs are oriented in a plane which is substantially perpendicular to the plane in which the disk 12 is disposed. This orientation, which is clearly shown in FIGS. 5 and 6, permits the surfaces 34 and 36 to establish a stationary base directly beneath the disk 12 which maintains the disk in its proper orientation perpendicular to the coating surface during a measurement operation. In addition, even if the apparatus is canted to one side or the other of the preferred orientation, there is very little effect on the measurement since the edges, 60, 62 in FIG. 6, of the contact surfaces 34 and 36 act as pivot edges about which any canting must occur. For example, if the apparatus as viewed in FIG. 6, is canted to the left, the apparatus would pivot slightly about the edge 60. Since the left surface of the disk 12 is positioned directly above the edge 60, it will move in a path along the top of an arc having edge 60 as a pivot and will not greatly affect the measurement. This same affect occurs in the opposite direction when the apparatus is canted to the right in FIG. 6 about the edge 62. Thus, the apparatus is fairly insensitive to slight canting in either direction. This construction enables the apparatus to be easily used by a person having little or no experience in the operation of wet coating thickness measurement instruments. In addition, the construction results in a light weight, easily manufactured assembly which is inexpensive to produce. When it is desired that an apparatus have a range which includes coating thicknesses greater than, e.g. 100 mils, it is possible merely to construct the apparatus with legs 30 and 32 which are of a length sufficient to provide the disk 12 at a height within the desired thickness range. In this manner, very thick coatings can be easily and accurately measured.

The measurement disk 12 and the support bipod 14 are held together by the support shaft 24 of the finger gripping assembly 16 as shown in FIG. 2. A first gripping assembly member 38 is comprised of a knob 40 having a bolt, which serves as the support shaft 24, attached to an inner surface 42 thereof and extending perpendicularly from the inner surface. This bolt 24 extends through the holes 28 and 20 in the support bipod 14 and the measurement disk 12. A spacer 44 is supported on the support shaft 24 between the support bipod 14 and the measurement disk 12 to separate the disk 12 from the support bipod 14 and to permit relative movement between the two members.

A second knob 46 is provided adjacent the measurement disk 12 opposite the support bipod 14 and includes a threaded internal bore 48 in which the bolt 24 is received. Between the second knob 46 and the measurement disk 12 is provided a spring washer 50 or the like which separates the knob 46 from the measurement disk 12 and which permits light resistive movement of the measurement disk 12 with respect to the knob 46.

The assembled apparatus is shown in FIGS. 3 and 4. As can be seen from the phantom lines in FIG. 3, the measurement disk 12 is movable relative to the remainder of the apparatus so that the support bipod 14 and the grips 40, 46 of the gripping assembly can be held stationary while measurement is made by rotating the disk 12 into contact with the coating surface. From FIG. 3, it can be seen that the measurement disk 12 and support bipod 14 are sized so that the measurement disk 12 can be rotated completely around the support axis defined by the hole 20 without contacting the legs 30 and 32 of the bipod 14. This permits freedom of movement of the disk 12 while providing a stable base directly beneath the plane of the disk and ensures that the orientation of the disk will be maintained during a measurement operation. In FIG. 4, the rear side of the apparatus is shown. It is noted that although no markings are shown on the rear surface of the disk 12 in the figure, it is possible to place identical markings 18 on both the front and rear faces of the disk 12 to enable an operator to easily read a measured value across the edge of the circumference of the disk 12. Alternatively, markings indicative of a different standard of measurement may be placed on the rear surface to permit simple reading of a thickness in either of two standards.

A preferred method of making thickness measurements of wet coatings or films includes the following operations. The measurement disk 12 is positioned adjacent a coating to be measured by lowering the support bipod legs 30 and 32 into the coating so that the lower contact surfaces 34 and 36 of the legs 30 and 32 contact the upper surface of the coating supporting surface 52. This relationship between the legs 30 and 32 and the supporting surface 52 is shown e.g. in FIG. 6. When the disk 12 is positioned adjacent the coating, the disk is oriented with respect to the support bipod 14 in such a way that the central axis 22 of the disk 12 is not located directly between the coating and the supporting axis defined by the hole 20 of the disk. In other words, the disk 12 is oriented on the support bipod 14 in such a way that the greatest radial length of the disk does not extend directly between the support axis defined by the hole 20 and the coating surface. By having the greatest radial length of the disk rotated away from the coating surface, it is possible to place the support bipod contact surfaces 34 and 36 against the supporting surface without the disk contacting the wet coating surface.

Once the measurement disk 12 has been properly positioned adjacent the coating, the operator holds the apparatus by gripping the gripping knobs 40 and 46 while the measurement disk 12 is slowly rotated in a direction that will bring a portion of the disk having larger radial lengths into the vicinity of the coating surface. This rotation is continued until the circumference of the disk 12 has come into contact with the surface of the coating. This contact can be noticed by closely observing the surface of the coating since the surface will be interrupted upon the contact and will show signs of the interruption such as by a meniscus of the coating on the gauge.

After contact of the disk has been noted, the apparatus is removed from the vicinity of the coating and the position along the circumference of the disk at which the coating contacts the disk is recorded. As mentioned above, it may be advantageous to provide a scale along both halves of the disk to permit two measurements to be made during a single operation so that the measurements can be averaged into a final accurate thickness value. In order to carry out the two measurements, the disk 12 would first be rotated in a first direction in the manner discussed above. However, after the disk 12 has been rotated into contact with the surface of the wet coating, the disk is then rotated in the opposite direction until the circumference of the disk once again contacts the surface of the coating along the opposite half of the disk.

Thus, it can be seen that measurements can be made of wet coating thicknesses with a simple, light weight and inexpensive apparatus by employing an easy to follow method of operation. This method permits accurate measurements to be made even by unskilled workers by removing the need for special skills to operate the measurement apparatus.

While this invention has been illustrated and described in accordance with a preferred embodiment, it is recognized that variations and changes may be made and equivalents employed herein without departing from the invention as set forth in the claims.

What is claimed is:

1. An apparatus for use in the measurement of the thickness of a wet coating applied to a supporting surface, comprising:

a measuring disk having a support axis, a circumferential edge, the radial distance between said support axis and said circumferential edge varying at points along at least a portion of said circumferential edge, and indicia indicative of a coating thickness around said portion of said circumference;

disk support means for supporting said disk in a plane substantially perpendicular to a surface of the coating and for permitting rotation of said disk in said plane about said support axis, said disk support means including at least one support leg adapted to penetrate the coating and rest on the supporting surface to position said disk in said plane substantially perpendicular to the coating surface and to maintain said disk in said plane while a measurement is made; and means for gripping said apparatus while said measuring disk is rotated to enter the coating and for maintaining said disk support means in a stationary position while a measurement is made.

2. The thickness measurement apparatus according to claim 1, wherein said disk is substantially circular and includes a central axis which is offset with respect to said support axis.

3. The thickness measurement apparatus according to claim 1, wherein said at least one support leg has an end portion which is canted and which includes an end surface which is adapted to rest on the supporting surface and to be maintained in contact with the supporting surface when a measurement is being made.

4. The thickness measurement apparatus according to claim 2, wherein two support legs are provided, said legs being positioned in a plane generally parallel to the plane in which the disk is located and being positioned an equal distance to either side of said support axis of said disk.

5. The thickness measurement apparatus according to claim 4, wherein both support legs have end portions which are canted and which include end surfaces adapted to rest upon the supporting surface and to be maintained in contact with the supporting surface when a measurement is being made.

6. The thickness measurement apparatus according to claim 2, wherein said indicia includes two identical sets of markings each covering one half of said circumference and extending from a point on the circumference which is at the greatest radial distance from said support axis to a point on said circumference which is at the shortest radial distance from said support axis.

7. The thickness measurement apparatus according to claim 2, wherein said means for gripping said apparatus includes means for holding said disk on said disk support means.

8. The thickness measurement apparatus according to claim 2, wherein said disk support means includes a support body having a hole therethrough coinciding with said support axis of said disk and two support legs.

9. The thickness measurement apparatus according to claim 2, wherein said disk includes a first hole located along said support axis and said disk support means includes a second hole at a position at which said support axis of said disk is to be supported, said gripping means including a first knob adjacent said first hole, a second knob adjacent said second hole and a shaft extending between said knobs and through said holes to support said disk and said gripping means on said disk support means.

10. A method of measuring the thickness of a wet coating applied to a supporting surface, comprising the steps of:

positioning a measurement disk support member on the supporting surface with at least one leg of the disk support member penetrating the coating to rest on the supporting surface and with a measurement disk which is supported on the disk support member being positioned adjacent to and out of contact with a coating to be measured so that the disk is located in a plane which is substantially perpendicular to the coating;

rotating the disk in a first direction within the plane about a support axis while maintaining the position of the disk support member relative to the supporting surface so that a circumference of the disk which includes points that are located at varying radial distances from the support axis comes into contact with the wet coating;

stopping the rotation once the circumference of the disk has come into contact with the surface of the wet coating;

removing the disk and disk support member from the vicinity of the coating; and noting the position along the circumference of the disk at which the wet coating has contacted the disk, this position being indicative of the thickness of the wet coating at the point of measurement.

11. The method according to claim 10, further comprising the step of rotating the disk in a second direction within the plane about the support axis after the circumference of the disk has contacted the surface of the wet coating until the circumference of the disk contacts the surface of the wet coating a second time, and noting both positions on the circumference of the disk at which the wet coating has contacted the disk, these positions each being indicative of the thickness of the wet coating at the point of measurement.

* * * * *